Figure 1:
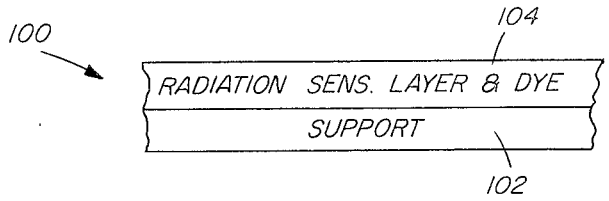
Figure 2:
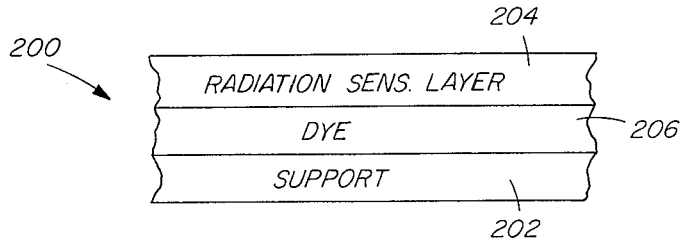
Figure 3:
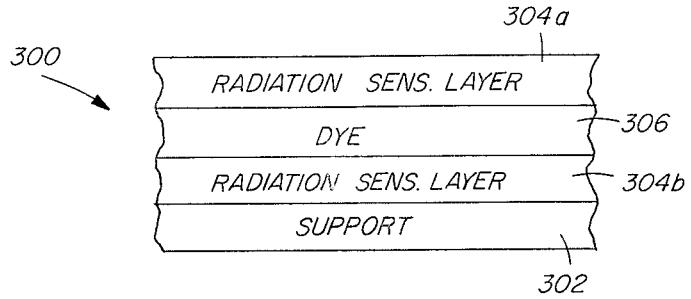
Figure 4:
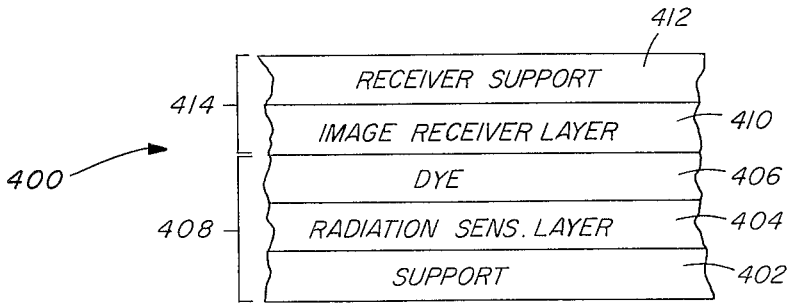
Figure 5:
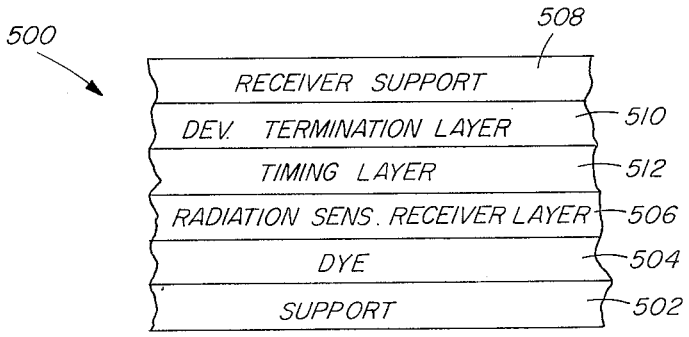
Figure 6:
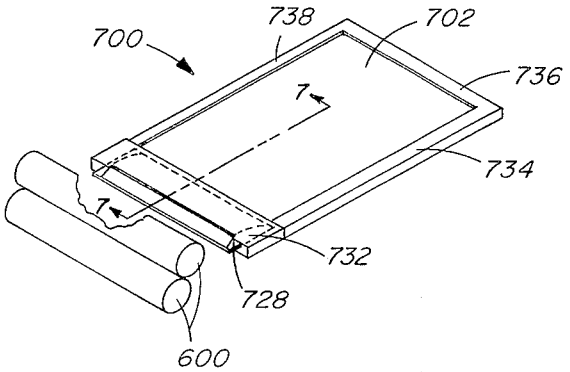
Figure 7:
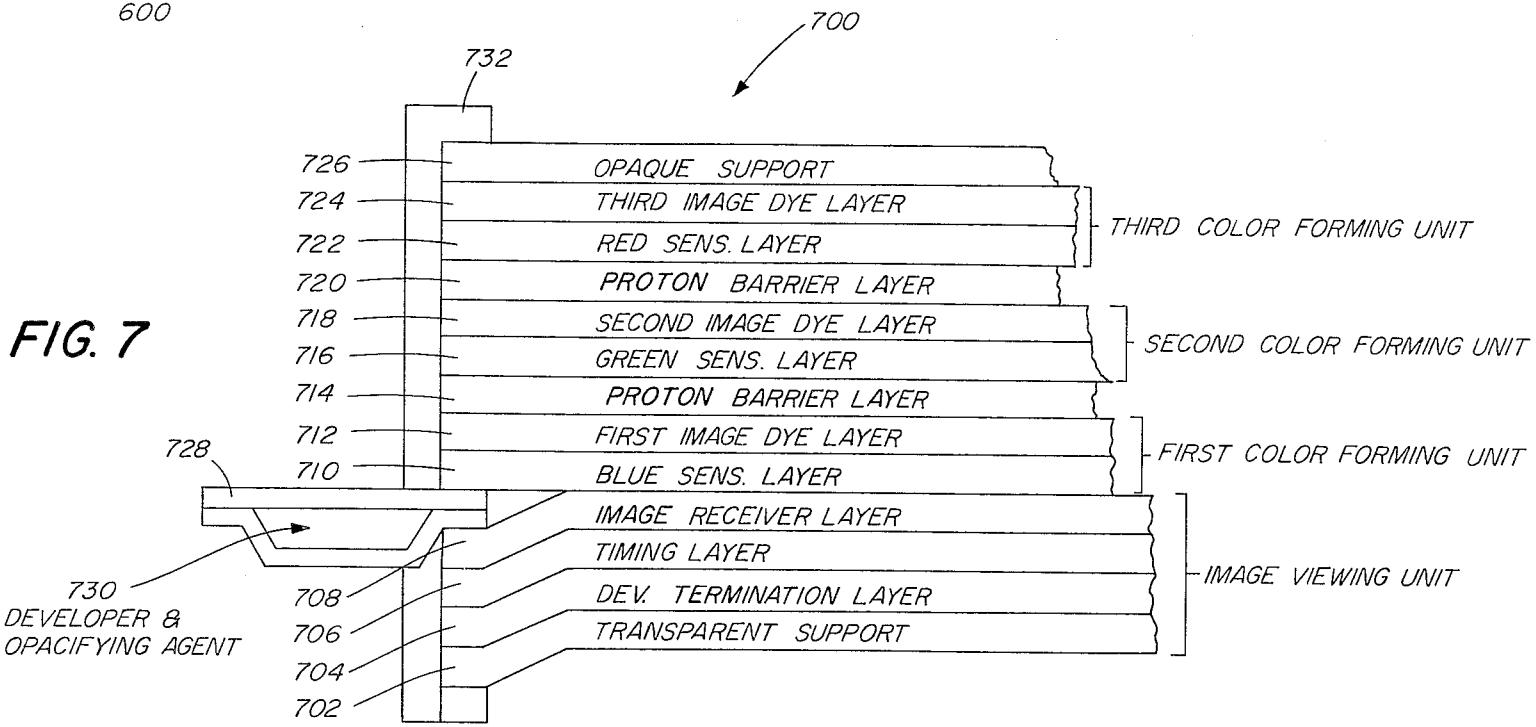

United States Defensive Publication

[19] (H) [11] T957,002

Meyer [43] Apr. 5, 1977

[54] PHOTOGRAPHIC IMAGE TRANSFER ELEMENT AND PROCESS

[76] Inventor: James W. Meyer, c/o Kodak Park Division, Rochester, N.Y. 14650

[21] Appl. No.: 738,767

[22] Filed: Nov. 4, 1976

Related U.S. Application Data

[63] Continuation of Ser. No. 610,480, Sept. 3, 1975, abandoned.

[51] Int. Cl.[2] ..... G03C 5/54; G03C 7/00; G03C 1/40

[52] U.S. Cl. ..... 96/29 D; 96/3; 96/77

[57] ABSTRACT

A photographic element is disclosed which includes a support having as a coating thereon a radiation-sensitive layer capable of selectively releasing protons in exposed areas. In direct contact with the radiation-sensitive layer is an image-forming dye capable of shifting between a mobile and an immobile form in an aqueous medium upon protonation of a carboxy or amine substituent. The portion of the dye remaining mobile after imagewise protonation can be transferred to a receiver sheet to form a viewable dye image.

24 Claims, 2 Sheets Drawing, 60 Pages Specification

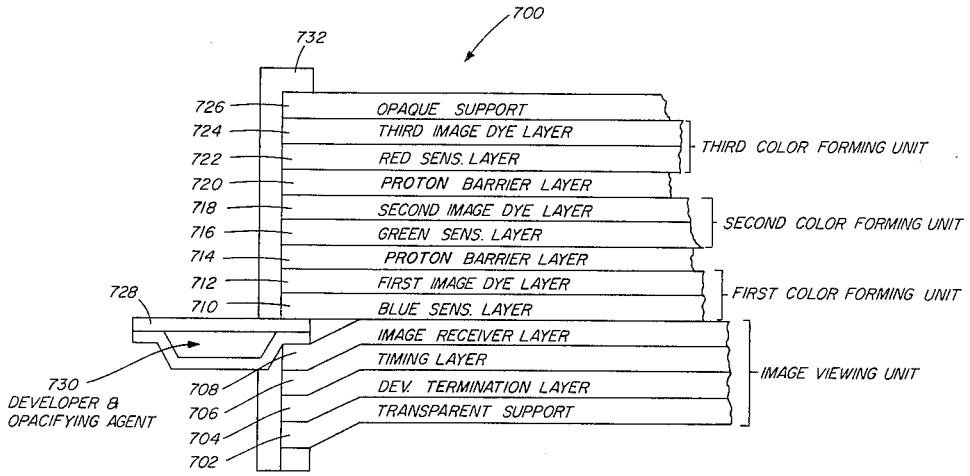

The file of this unexamined application may be inspected and copies thereof may be purchased (849 O.G. 1221, Apr. 9, 1968).